United States Patent Office 3,514,210
Patented May 26, 1970

3,514,210
DEVICE FOR PROGRAMMED DRAWING OFF OF GAS BUBBLES FROM A MEASURING CELL SEPARATOR AND THE LIQUID FROM THE EXTINCTION CELL SPACE
Jiri Hrdina, 8 Na Stahlavce, Prague, Czechoslovakia
Filed Jan. 15, 1968, Ser. No. 697,881
Int. Cl. G01n 3/03
U.S. Cl. 356—246                             2 Claims

ABSTRACT OF THE DISCLOSURE

A colorimeter flow cell has a single inlet and two outlets, a first for removing a sample to be tested and a second for removing gas bubbles positioned between segments of sample to be tested. A pump with a multi-way value is provided to exhaust the segmented sample and bubbles, so that there is a maximal reduction of all idle spaces between the working space of the pump and the multi-way value.

---

My invention relates to a device for a programmed emptying of the contents of a photometric measuring cell.

Modern automatic analyzers, particularly for mixtures of amino acids and similar substances require that the content of the photometric measuring cell be drawn off after each photometric measuring within exactly defined intervals and that thereafter fresh liquidal matter be introduced thereinto.

The liquid is supplied to the measuring cell through a capillary pipeline wherein the individual sections of liquid are separated by gas bubbles to prevent mixing thereof which would lead to depreciated results.

At the point where the supplying pipeline joins the photometric measuring cell, it is necessary to separate the gas bubbles from the liquid to be photometrically measured because the liquid must fully and completely fill the photometric cell and the presence of gas bubbles in the cell would cause a false result of the measuring. Hence, separating means for the gas bubbles are arranged in front of the extinction cell space. This separating means is substantially formed by a chamber whose lower part is connected to the extinction cell space and its upper part to an exhausting pipeline. It is apparent from the beforesaid that during continuous operation of the analyzer accurate amounts of the liquid and gas have to be exhausted from the photometric cell in exactly defined intervals.

The entire volume of the gas bubbles must be exhausted safely from the separating chamber or the like. To prevent possible residues of gas bubbles from accumulating in the separating device and from penetrating finally the extinction cell space, it is in practice desirable to exhaust a volume slightly larger than the proper volume of the gas bubbles so that a small amount of the liquid is exhausted as well. Likewise, it is desirable to exhaust safely from the extinction cell space all liquid introduced thereinto and additionally a small amount of newly supplied liquid in order to insure that the extinction space is always filled only with the liquid encased between two consecutive bubbles and that not even the slightest trace of the liquid already measured photometrically in the preceding cycle remains therein.

These conditions require accuracy and timely stability of the operation of exhausting pumps.

It is already known to use for this purpose two independent peristaltic pumps which however do not have a very great accuracy due to the elasticity of their operating spaces. Another deficiency is the dependence of their transporting effect on the pressure changes in the sucking and discharging pipelines. Likewise, in the transmission means coupling said pumps, clearances may appear which will modify predetermined and adjusted working conditions.

My invention is based on the knowledge that a precision piston pump is most expedient for a long term continuous operation with accurately reproducible results. The device according to the invention is equipped with just one pump of this type which is used for drawing off gas bubbles as well as liquid from the extinction cell space.

The principle of my new device consists therein that integrated in a substantially common body are arranged a working space of the piston pump as well as a cavity for the core of a multiple-way valve on the other. The working space and the valve cavity are interconnected by a channel. A feeding pipeline connects the separating chamber with one inlet of said multiple-way valve, a second pipeline connects the extinction space of the cell with a second inlet of the valve, and a discharging pipeline leads from the multiple-way valve.

The advantage of my new device is a maximal reduction of all idle spaces betwen the working space of the pump and the distributing means, i.e. the multiple-way valve. The influence of these idle spaces shows up in the same way during the suction and the discharge so that it can be taken into consideration in advance. As these spaces are included in a solid body, they are not subject to deformations under different pressures as in the case of peristaltic pumps.

The said and other objects of my invention will be more fully understood from the following specification when read with the accompanying drawings wherein.

Figure 1:
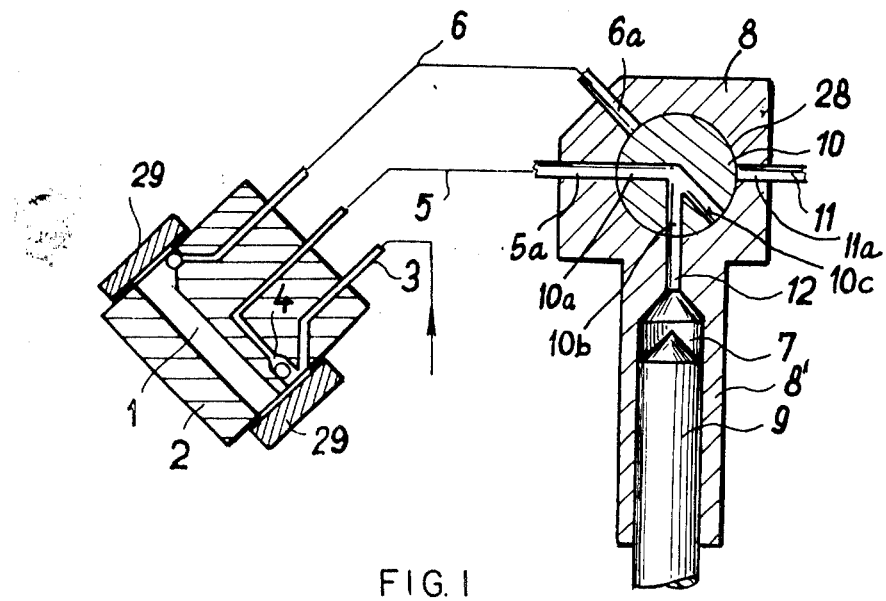
FIG. 1 shows schematically in section a photometric measuring cell connected with a multi-way valve arranged together with a pump cylinder in a common body.

An extinction space 1 is formed in the photometric measuring cell 2 by a bore hole closed at each end by a transparent plate 29. Luminous beams pass through these plates 29 and the extinction space 1 during the photometric measuring. The liquid to be measured photometrically is fed into the photometric cell 2 by supply pipeline 3 as indicated by the preceding arrow from the not shown analyzer apparatus. The feed line 3 terminates in the separating chamber 4 in which the gas bubbles separating individual sections of the liquid to be measured are liberated and exit from the separating chamber 4 through escape piping 5 introduced thereto. The liquid enters thereafter the extinction space 1 and after being photometrically measured therein is drawn off by the suction piping 6 while another batch of liquid enters thereinto. Both pipings 5 and 6 lead into channels 5a and 6a in the box 8 of a multiple-way valve, whose core 10 is rotatable therein in a cavity 28 having a cylindrical, conical or any other suitable rotational shape. The valve cavity 28 is interconnected through the channel 12 with the working space 7 of a piston pump comprising the reciprocable piston 9.

The multiple-way valve core 10 includes channels 10a, 10b, 10c which interconnect gradually individual feed channels 5a, 6a of the mutiple-way valve box 8 with the channel 12. At least one discharging pipeline 11 is disposed on the outlet side of the multiple-way valve. However, even a larger number of such discharging pipelines 11 may be arranged should it be desired to divide the discharged liquid into more than one path.

The channels 10a, 10b, 10c must be so arranged in the core 10 of the multiple-way valve that during rotation of the core 10 the inlet channels 5a, 6a never be mutually interconnected or connected with the discharge suction channel 11a leading into the discharge piping 11 but that the flow through the multiple-way valve be in any case determined exclusively by the motions of the piston 9 governing the operating space 7 of the pump.

As shown in FIG. 1 the core 10 of the multiple-way valve contains three radial channels 10a, 10b, 10c of which channels 10a, 10b are mutually vertical and the third channel 10c is inclined at 45° toward one of the preceding channels. In the illustrated position the escape piping 5 for the gas bubbles is interconnected with the channel 12 so that the downwardly moving piston 9 draws gas bubbles from the separating chamber 4. If the core 10 of the multiple-way valve is adjusted clockwise by 45° the pipeline 6 is interconnected over channel 6a with the channel 12 so that during the continuing downward motion of the piston 9 the liquid will be drawn from the extinction space 1 of the measuring cell 2. If thereafter the core 10 of the multiple-way valve is turned anticlockwise by 135° the channel 12 and the discharging pipeline 11 will be interconnected so that during the ensuing upward motion of the piston 9 the formerly sucked in exhausted gas will be discharged through pipeline 11 to the waste.

Figure 2:
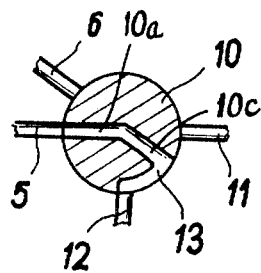
FIG. 2 shows in cross section an amended rotatable core of said valve.

FIG. 2 shows another arrangement of the core 10 of the multiple-way valve wherein channel 10b of FIG. 1 is left out and a peripheral groove 13 on core 10 allows the same to perform the same functions as has been described with regard to FIG. 1.

Figure 3:
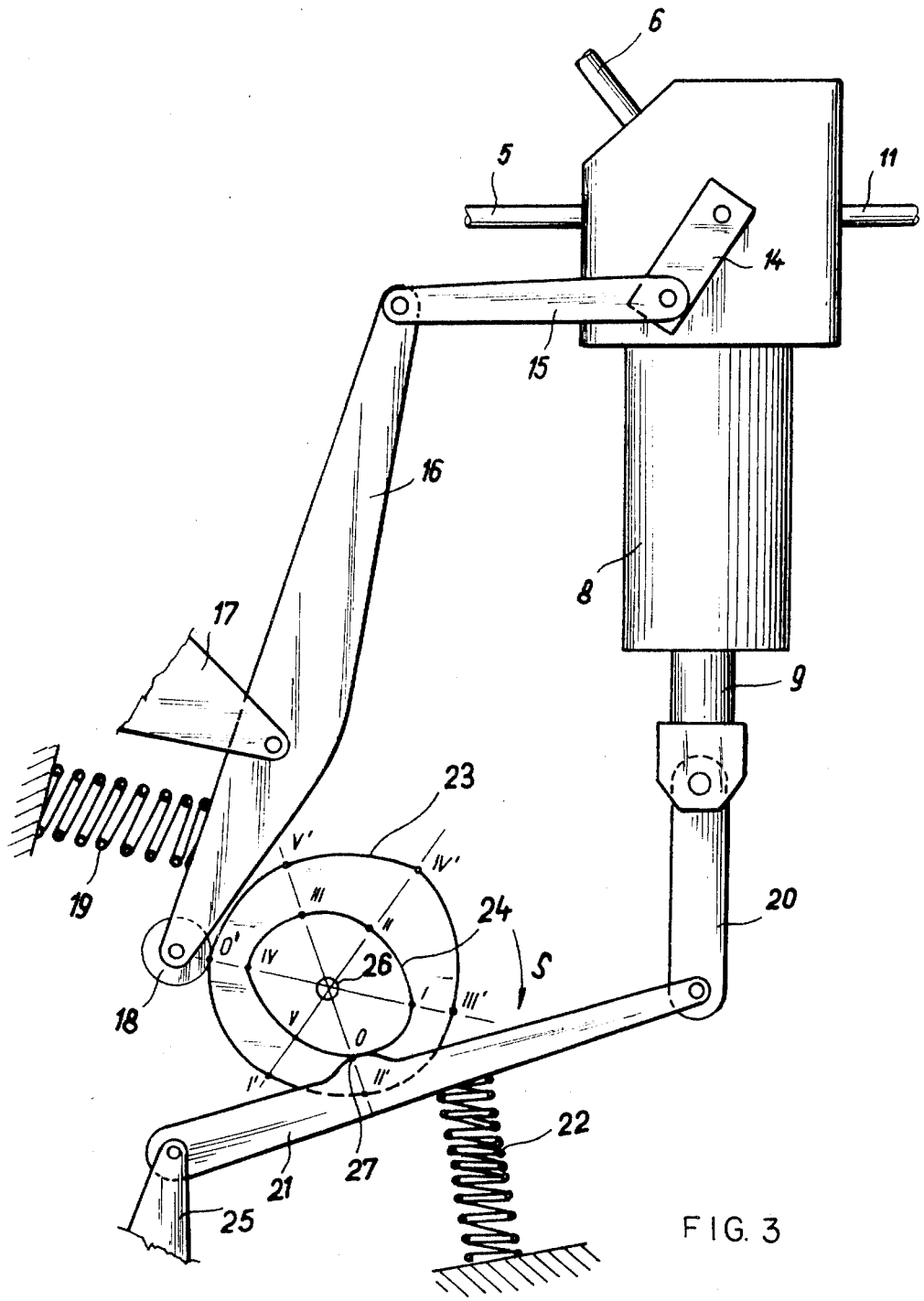
FIG. 3 shows driving means common to the valve means and the pumping means.

FIG. 3 illustrates schematically the steering mechanism basically comprising two co-axial cams 23 and 24 seated on and driven by a common shaft 26.

A pulley 18 attached revolvingly to one arm of a two-arm lever 16 is rolling on the cam 23. Said lever 16 is disposed on a console 17 and is so forced by pressure spring 19 that the pulley 18 remains in a permanent cooperation with the cam 23. Linked to the end of the other arm of the lever 16 is one end of a pull rod 15 its other end being linked to an arm 14 which is connected and controls the core 10 of the multiple-way valve.

The piston 9 of the pump is by means of a pull rod 20 connected with a lever 21 which rests rockingly on the console 25 and is permanently under the influence of a pressure spring 22. The lever 21 is provided with a lobe 27 for cooperation with the other cam 24. Instead of the lobe 27 a pulley adjusted like pulley 18 of the two-arm lever 16 may be used if desired.

During clockwise rotation of the driving shaft 26 as indicated by arrow S the piston 9 and the core 10 act synchronically whereby the above described operation of the device materializes automatically. FIG. 3 represents the device in its initial position while this is stressed by the designation O' and O at the contact points of the pulley 18 and the lobe 27 respectively, contact the cams 23 and 24 at points O' and O.

When the cams 23 and 24 rotate in clockwise direction the device operates in individual succeeding steps as follows:

(1) The contact point of cam 23 moves from position O' to josition I' and the contact point of cam 24 from position O to position I; the valve core 10 is at rest in the position shown in FIG. 1, the piston 9 moves downwardly drawing gas bubbles by the pipeline 5 from the separating chamber 4 into the operating space 7 of the pump;

(2) Thereafter the contact point I' of cam 23 moves into the position II' and the contact point I of cam 24 into the position II; the valve core 10 is turned in clockwise direction to interconnect the pipeline 6 with the channel 12, while the piston 9 remains in the position reached after having drawn off the gas bubbles from the separating chamber 4;

(3) The contact point II' of cam 23 moves to the position III' and the contact point II of cam 24 moves to the position III; the valve core 10 is again at rest and the piston 9 continues in its downward motion drawing off through the pipeline 6 the liquid from the extinction space 1 of the measuring cell 2 into the operating space 7 of the pump;

(4) The contact point III' of cam 23 moves to the position IV' and the contact point III of cam 23 moves to the position IV; the valve core 10 is turned in anticlockwise direction to connect the channel 12 with the discharge pipeline 11 while the piston 9 rests;

(5) The contact point V' of cam 23 moves to the initial position O' and the contact point V of cam 24 to the initial position O; the valve core 10 returns also into the initial position shown on FIG. 1 and the piston 9 stays in its upper rest position.

During additional rotations of the cams 23 and 24 the before described steps are periodically repeated.

Although certain embodiments of my invention have been shown and described by way of illustration, it will be understood that my invention may be otherwise embodied within the scope of my appended claims.

What I claim as my invention is:

1. In combination with a measuring cell for a liquidal flow sectionalized by gas bubbles, a device for programmed operation comprising in combination a feed line for the liquidal flow leading into the measuring cell; an extinction space and a separating chamber communicating therewith within the measuring cell; said separating chamber receiving said feed line and preceding said extinction space to isolate gas bubbles from the liquid passing thereinto; a first suction line leading from the separating chamber to carry off isolated gas bubbles; a second suction line leading from the extinction space to carry off measured liquidal portions; a valve body including a cavity rotatably housing a valve core; a first and a second channel substantially radially leading outwardly from said valve cavity, each into one of said suction lines, and a third outlet channel substantially radially leading away from said valve cavity; a pumping member extending from said valve body substantially radially to the longitudinal axis of its cavity and including a pumping space and a piston reciprocable therein; a fourth substantially radial channel in the valve body connecting the pumping space with the valve cavity; three mutually inwardly connected radial distributing ducts in the valve core; and actuating means for alternate adjusted operation of the reciprocable piston and of the rotatable valve core to succeedingly connect the first and the second radial channel with the fourth radial channel to draw off gas bubbles and liquidal portions, respectively, into the pumping space and thereafter to drive out the same through the communicatably positioned third and fourth channels.

2. A device according to claim 1 comprising a groove operatively replacing the intermediate of the three radial distributing ducts of the valve core, said groove circumferentially extending on the valve core from the outer duct cooperating with the said third channel toward the other outer duct cooperating alternately with the said first and the second channel of the valve body.

References Cited

UNITED STATES PATENTS

| | | | |
|---|---|---|---|
| 2,494,884 | 1/1950 | Lassman et al. | 103—2 |
| 3,222,135 | 12/1965 | Ashmead | 23—253 |
| 3,236,602 | 2/1966 | Isreeli | 23—253 |
| 3,373,872 | 3/1968 | Hrdina | 210—198 |
| 3,408,166 | 10/1968 | Natelson | 23—253 |

RONALD L. WIBERT, Primary Examiner

R. J. WEBSTER, Assistant Examiner

U.S. Cl. X.R.

23—253, 259, 230; 250—218; 103—2